United States Patent [19]

Priest

[11] Patent Number: 5,486,921
[45] Date of Patent: Jan. 23, 1996

[54] OPTIMUM COUPLER CONFIGURATION FOR FIBER OPTIC RATE GYROSCOPE USING [3×3] COUPLER

[75] Inventor: John F. Priest, Tomball, Tex.

[73] Assignee: Litton Systems, Inc., Woodland Hills, Calif.

[21] Appl. No.: 223,049

[22] Filed: Apr. 5, 1994

[51] Int. Cl.$^6$ .................................................. G01C 19/22
[52] U.S. Cl. ................................................ 356/350; 385/14
[58] Field of Search .................................. 356/350, 345; 385/12, 14

[56] References Cited

U.S. PATENT DOCUMENTS

| | | |
|---|---|---|
| 4,264,126 | 4/1981 | Sheem . |
| 4,440,498 | 4/1984 | Sheem . |
| 4,479,715 | 10/1984 | Sheem . |
| 4,944,590 | 7/1990 | Poisel et al. . |
| 5,037,204 | 8/1991 | Poisel et al. ............................ 356/350 |
| 5,195,151 | 3/1993 | Campbell, Jr. et al. .................. 385/42 |

*Primary Examiner*—Samuel A. Turner
*Attorney, Agent, or Firm*—Lynn & Lynn

[57] ABSTRACT

A fiber optic rotation sensor includes a [3×3] optical coupler formed of first, second and third optical waveguides. The first, second and third optical waveguides are formed such that the fractions of light coupled from any one of the first, second and third optical waveguides to the other two optical waveguides are constant, independent of thermally-induced changes in the interaction length. An optical signal source provides an input optical signal to the first optical waveguide such that portions of the input optical signal are coupled from the first optical waveguide into the second and third optical waveguides. The optical fiber in which the sensing loop is formed has ends that are coupled to the second and third optical waveguides to receive optical signals that form counterpropagating optical waves in a fiber optic sensing loop and to combine the counterpropagating optical waves after they have traversed the sensing loop.

4 Claims, 1 Drawing Sheet

OPTIMUM COUPLER CONFIGURATION FOR FIBER OPTIC RATE GYROSCOPE USING [3×3] COUPLER

BACKGROUND OF THE INVENTION

This invention relates generally to Sagnac effect rotation sensors and particularly to fiber optic rotation sensors that guide counterpropagating light waves in a sensing loop to measure rotations about a sensing axis perpendicular to the plane of the sensing loop. Still more particularly, this invention relates to fiber optic rotation sensors that use [3×3] couplers to supply optical signals to the sensing loop and to guide the optical output signals from the sensing loop to electrical apparatus that processes the optical output signals to determine the rotation rate.

Fiber optic rotation sensors are well-known in the art. Previous fiber optic rotation sensors included evanescent field couplers to couple light between two lengths of optical fiber. Subsequently, fiber optic rotation sensors using [3×3] couplers were developed. The primary advantage of using a [3×3] coupler in a fiber optic rotation sensor is the ease with which such devices are interfaced with electronics.

U.S. Pat. Nos. 4,440,498 and 4,479,715 to Sheem disclose two fiber optic rotation sensors that include [3×3] couplers. U.S. Pat. No. 4,440,498 is directed to a fiber optic rotation sensor that includes a fiber optic sensing loop and an input fiber. A [3×3] fiber optic coupler divides light between the input fiber and the two legs of the fiber optic sensing loop.

U.S. Pat. No. 4,479,715 discloses a Sagnac effect rotation sensor in which the ends of a fiber optic sensing loop are coupled to a pair of optical waveguides. Light is input to a central input waveguide that is between the optical waveguides that are coupled to the ends of the sensing loop fiber. The three optical waveguides are arranged to form a [3×3] optical coupler. The input light is coupled from the central input waveguide to the optical waveguides that are connected to the optical fiber coil to produce the counterpropagating waves in the fiber optic sensing loop. The waves traverse the sensing coil and combine in the coupler. The combined waves are detected, and the resulting electrical signals are processed to determine the rotation rate.

U.S. Pat. No. 4,944,590 to Poisel et al. discloses an optical fiber gyroscope that uses a [3×3] coupler to couple optical signals into and out of a fiber optic sensing loop. Poisel et al. discloses a photodetector arranged to detect the light that has been input the [3×3] coupler that is not coupled into the fiber optic sensing loop. The electrical signal resulting from detecting this light is used in signal processing circuitry to make adjustments for variations in the input light intensity.

Such fiber optic rotation sensors may be operated in phase quadrature, which provides maximum sensitivity at zero rotation rate. Unfortunately, previous fiber optic rotation sensors that include [3×3] optical couplers are sensitive to temperature changes. The coupling ratios of the [3×3] fiber optic couplers are temperature-sensitive such that bias errors of 1000° per hour are typically observed. Errors of such magnitude are unacceptable for most applications of rotation sensors.

SUMMARY OF THE INVENTION

The present invention is an improved fiber optic rotation sensor using [3×3] couplers with optimized coupling ratios. The coupling ratios are selected to prevent changes in the amount of light coupled into the two counterpropagating waves caused by temperature changes and other mechanical factors. The selected coupling ratios also maximize the optical power output that is delivered to the rate photodetectors.

A fiber optic rotation sensor according to the present invention comprises a [3×3] optical coupler that includes first, second and third optical waveguides arranged to have an interaction length in which light couples between the first, second and third optical waveguides, the first, second and third optical waveguides being formed such that the fractions of light coupled from any one of the first, second and third optical waveguides to the other two optical waveguides are constant, independent of thermally-induced changes in the interaction length. An optical signal source is arranged to provide an input optical signal to the first optical waveguide such that portions of the input optical signal are coupled from the first optical waveguide into the second and third optical waveguides. The optical fiber in which the sensing loop is formed has ends that are coupled to the second and third optical waveguides to receive optical signals that form counterpropagating optical waves in the sensing loop and to combine the counterpropagating optical waves after they have traversed the sensing loop.

The optical coupler is formed such that first, second and third optical waveguides being formed such that the optical splitting ratios between the first, second and third optical waveguides are 0.4108: 0.1783: 0.4108, so that when light intensity $A^2$ is input to the first optical waveguide, the optical intensity output by each of the second and third optical waveguides to the optical fiber to form the counterpropagating waves is $0.4108A^2$ and the optical intensity output by the first optical waveguide is $0.1783A^2$.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

Figure 1:
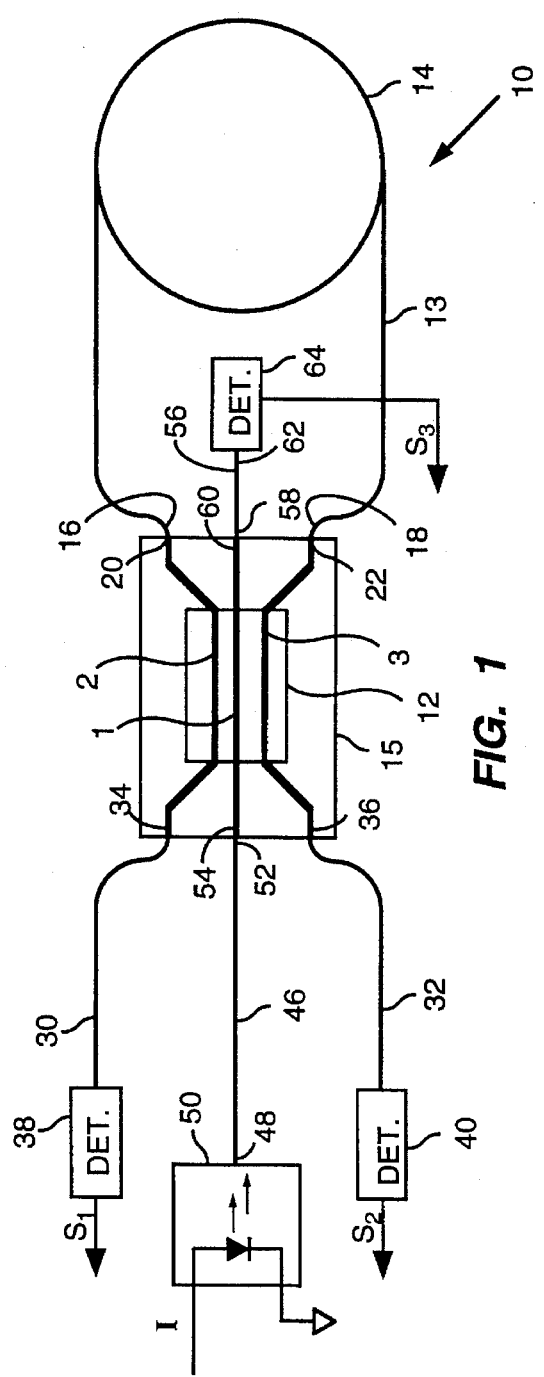
FIG. 1 illustrates a fiber option rotation sensor that includes a [3×3] evanescent field optical coupler.

Referring to FIG. 1, a fiber optic rotation sensor 10 includes a [3×3] optical coupler 12 and a length of optical fiber 13 arranged to form a fiber optic sensing coil 14. The optical coupler 12 includes optical waveguides 1–3 formed on a substrate 15. The optical fiber 13 has ends 16 and 18. The fiber ends 16 and 18 are butt-coupled to ends 20 and 22 of the corresponding optical waveguides 1 and 2, respectively.

A pair of output optical fibers 30 and 32 are connected to ends 34 and 36 of the optical waveguides 2 and 3, respectively. The output optical fiber 30 directs a light beam to first photodetector 38, which produces an electrical signal $S_1$ that is indicative of the intensity of the optical signal transmitted thereto by the output optical fiber 30. Similarly, the output optical fiber 32 directs a beam of light to a second photodetector 40, which produces an electrical signal $S_2$ that is indicative of the intensity of the optical signal transmitted thereto by the output optical fiber 32.

The optical waveguide 1 is formed in the substrate 15 between the optical waveguides 2 and 3. The optical waveguides 1–3 are arranged to form the [3×3] coupler 12. The [3×3] coupler 12 is preferably an evanescent field coupler.

An input optical fiber 46 has an end 48 that receives light from a light source 50. The other end 52 of the input optical fiber 46 is butt-coupled to an end 54 of the optical waveguide 1. An output optical fiber 56 has one end 58 butt-coupled to an end 60 of the central optical waveguide 3. The other end 62 of the output optical fiber 56 directs a beam of light to a third detector 64, which produces an electrical signal $S_3$ that is indicative of the intensity of the optical signal transmitted thereto by the output optical fiber 56.

The [3×3] coupler 12 is preferably an evanescent field coupler that couples optical signals between the optical waveguide 1 and the optical waveguides 2 and 3. A portion of the light input to the [3×3] fiber optic coupler 12 remains in the optical waveguide 1.

Figure 3:
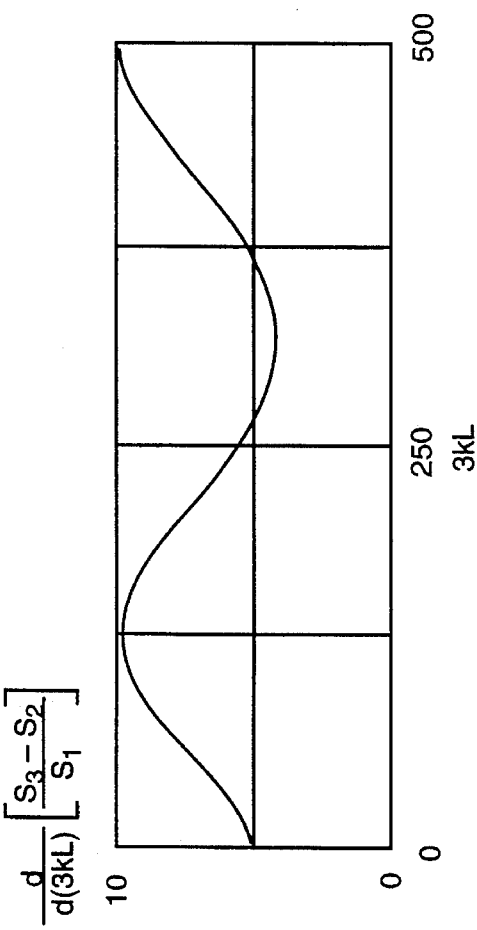
FIG. 3 illustrates the derivative with respect to coupling length of the intensity of the signal output by the fiber optic rotation sensor of FIG. 1.

Referring to FIG. 3, the [3×3] coupler has a coupling length L in which the evanescent fields of light waves guided by the waveguides 1–3 interact so that light couples between them. The intensity of light coupled between the waveguides 1–3 is a function of the coupling length L. As the temperature of the coupler 12 fluctuates, the light intensity coupled between the waveguides 1–3 also fluctuates.

In an ideal environment the three coupling ratios of the [3×3] optical coupler 12 are all equal to ⅓. When the coupling ratios are all equal to ⅓, the light intensities output from the three optical waveguides 1–3 are equal. However, because of temperature sensitivity mentioned above, if the coupling ratios of the [3×3] optical coupler 12 are all ⅓ at a particular desired operating temperature, then unacceptably large errors result because of unavoidable temperature fluctuations that cause the coupling ratios to change. The present invention comprises a fiber optic rotation sensor using a [3×3] coupler that have coupling ratios selected to minimize the bias errors to the order of 10° to 100° per hour and which is insensitive to temperature changes. It has been found that there is a set of coupling ratios for which the fraction of light coupled into any selected one of the optical waveguides 1–3 remains constant as the coupling length L changes in response to temperature changes.

Figure 2:
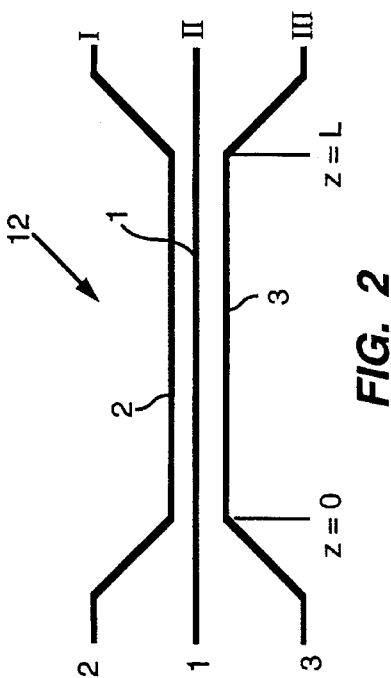
FIG. 2 schematically illustrates a [3×3] coupler.

The optimum configuration for the [3×3] optical coupler 12 is insensitive to temperature changes while providing a larger rate discriminant than has been obtained with previous designs. Referring to FIGS. 2 and 3, the [3×3] optical coupler 20 may be described by the linear differential equations $$\frac{da_j}{dz} + ik_{j,j+1}a_{j+1} + ik_{j,j+2}a_{j+2} = 0 \tag{1}$$

where:
 $j=1,2,3$
 $j=j+3$
 $a_j$ is the light amplitude in waveguide j; and
 k is the coupling ratio between any two of the three fibers 1–3.

For example, $k_{12}$ is the coupling ratio between waveguides 1 and 2; $k_{23}$ is the coupling ratio between waveguides 2 and 3, and $k_{31}$ is the coupling ratio between waveguides 3 and 1. The coupler 12 is preferably formed so that the coupling constants are $k_{12}=k_{23}=k_{31}=k$ so that the solution to equation (1) is $$a_j(z) = c_j e^{ikz} + d e^{-2kz} \text{ with the condition that } \sum_{j=1}^{3} c_j = 1, \tag{2}$$

where c and d are constants. If the power input to the fiber optic rotation sensor 10 by the input optical fiber 46 to the [3×3] coupler 12 is $A^2$, then the amplitude of the light in the waveguides at the input end where z=0 is given by:

$$a_1(0)=A, \text{ and} \tag{3}$$

$$a_2(0)=a_3(0)=0. \tag{4}$$

Using Eqs. (3) and (4) in Eq. (1) gives information that may be used to find expressions for the constants c and d in terms of A, for which a numerical value can easily be ascertained.

$$A=c_1 e^{ik0}+d e^{-i2kz}. \tag{5}$$

$$A=c_1+d. \tag{6}$$

$$c_1=A-d. \tag{7}$$

$$0=c_2 e^{ik0}+d e^{-i2k0}. \tag{8}$$

$$c_2=-d. \tag{9}$$

$$0=c_3 e^{ik0}+d e^{-i2k0}. \tag{10}$$

$$c_3=-d. \tag{11}$$

From Eqs. (7), (9) and (11), it is found that $$c_1+c_2c_3=0. \tag{12}$$

$$A-d-d-d=0. \tag{13}$$

Therefore, the constants $c_1$, $c_2$, $c_3$ and d are given by:

$$d=\frac{A}{3}; \tag{14}$$

$$c_2 = c_3 = -\frac{A}{3}; \text{ and} \tag{15}$$

$$c_1 = \frac{2}{3}A. \tag{16}$$

At the other end of the coupler where the distance z=L, the solution equation for optical waveguide 1 becomes:

$$a_1(L)=\tfrac{2}{3}Ae^{ikL}+\tfrac{1}{3}Ae^{-i2kL}. \tag{17}$$

Squaring the amplitude to obtain the intensity of the light in optical waveguide 1 gives:

$$|a_1(L)|^2 = \left| \frac{2}{3} Ae^{ikL} + \frac{1}{3} Ae^{-i2kL} \right|^2. \tag{18}$$

$$|a_1(L)|^2 = \frac{A^2}{9} |2e^{ikL} + e^{-i2kL}|^2. \tag{19}$$

$$|a_1(L)|^2 = \frac{A^2}{9} |2\cos kL + i2\sin kL + \cos 2kL - i\sin 2kL|^2. \tag{20}$$

$$|a_1(L)|^2 = \frac{A^2}{9} |2\cos kL + \cos 2kL + i(2\sin kL - \sin 2kL)|^2. \tag{21}$$

$$|a_1(L)|^2 = \frac{A^2}{9} (4\cos^2 kL + 4\cos kL\cos 2kL + \cos^2 2kL + \tag{22}$$

$$4\sin^2 kL - 4\sin kL\sin 2kL + \sin^2 2kL).$$

$$|a_1(L)|^2 = \frac{A^2}{9} (5 + 4\cos 3kL). \quad (23)$$

At the other end of the coupler where the distance z=L, the solution equation for optical waveguide 2 becomes:

$$|a_2(L)|^2 = \left| -\frac{1}{3} Ae^{ikL} + \frac{1}{3} Ae^{-i2kL} \right|^2. \quad (24)$$

$$|a_2(L)|^2 = \frac{A^2}{9} |{-\cos kL - i\sin kL + \cos 2kL - i\sin 2kL}|^2. \quad (25)$$

$$|a_2(L)|^2 = \frac{A^2}{9} (\cos^2 kL - 2\cos kL\cos 2kL + \cos^2 kL) + \quad (27)$$
$$\sin^2 kL + 2\sin kL\sin 2kL + \sin^2 2kL).$$

$$|a_2(L)|^2 = \frac{A^2}{9} (2 - 2(\cos kL\cos 2kL - \sin kL\sin 2kL)). \quad (28)$$

$$|a_2(L)|^2 = \frac{2A^2}{9} (1 - \cos 3kL). \quad (29)$$

Because $a_2 = a_3$, where the distance z=L, the solution equation for optical waveguide 3 is:

$$|a_3(L)|^2 = |A_2(L)|^2 = \frac{2A^2}{9} (1 - \cos 3kL). \quad (30)$$

The optical intensity in the optical waveguides 2 and 3 is the optical intensity input to the fiber optic sensing coil 14 at the ends 16 and 18 of the optical fiber 12. Therefore the input to the legs of the fiber optic gyroscope are $|a_2(L)|^2$ and $|a_3(L)|^2$ given by Eqs. (29) and (30). These inputs to the fiber optic sensing coil 14 have a definite phase relationship. After traversing the fiber optic sensing coil 14, there is a phase shift $\phi$ between the counterpropagating waves. The return inputs to the coupler 12 after the counterpropagating waves traverse the fiber optic sensing coil 14 are given by:

$$a_I(0) = \phi; \quad (31)$$

$$a_2(0) = \left[ 2 \frac{A^2}{9} (1 - \cos 3kL) \right]^{.5} e^{\frac{i\phi}{2}}; \text{ and} \quad (32)$$

$$a_3(0) = \left[ 2 \frac{A^2}{9} (1 - \cos 3kL) \right]^{.5} e^{\frac{i\phi}{2}}. \quad (33)$$

Loop loss in the optical fiber 12 is ignored. The angle $\phi$ is the Sagnac phase shift angle between the beams caused by rotation of the sensing loop at angular velocity $\Omega$ about the sensing axis, which is perpendicular to the plane of the fiber optic sensing coil 14. The phase angle $\phi$ and the angular velocity $\Omega$ are related by the Sagnac equation:

$$\phi = \frac{2\pi l D}{\lambda c} \Omega. \quad (34)$$

where 1 is the length of the fiber in the sensing coil 14, D is the diameter of the sensing coil 14, $\lambda$ is the wavelength of the optical signals and c is the speed of light.

After propagating through the coupler 12 through the coupling length, L, the optical signals that have been output from the output of the fiber optic sensing coil are given by:

$$a_{II}(\phi,L) = \frac{1}{3} \left[ \frac{2A^2}{9} (1 - \cos 3kL) \right]^{0.5} \left[ \cos\frac{\phi}{2} + i3\sin\frac{\phi}{2} \right] e^{ikL} \quad (35)$$
$$\frac{2}{3} \left[ \frac{2A^29}{9} (1 - \cos 3kL) \right]^{0.5} \cos\frac{\phi}{2} e^{-2kL}.$$

$$a_{II}(\phi,L) = \frac{1}{3} \left[ \frac{2A^2}{9} (1 - \cos 3kL) \right]^{0.5} \left[ \cos\frac{\phi}{2} + i3\sin\frac{\phi}{2} \right] e^{ikL} + \quad (36)$$
$$2\cos\frac{\phi}{2} e^{-i2kL}.$$

$$|a_{II}(\phi,L)|^2 = \frac{1}{9} \left[ \frac{2A^2}{9} (1 - \cos 3kL) \right] * \quad (37)$$
$$\left| \left[ \left( \cos\frac{\phi}{2} + i3\sin\frac{\phi}{2} \right)(\cos(kL) + i\sin kL) + 2\cos\phi(\cos(2kL) - i\sin 2kL) \right] \right|^2.$$

$$|a_{II}(\phi,L)|^2 = \frac{2A^2}{81} (1 - \cos 3kL) \left[ \cos\frac{\phi}{2} \cos kL - 3\sin\frac{\phi}{2} \sin kL + \quad (38) \right.$$
$$\left. 2\cos\phi\cos kL + i \left( 3\sin\frac{\phi}{2} (\cos kL) + \cos i\sin kL(2\cos\phi\sin 2kL) \right) \right]^2.$$

$$|a_{II}(\phi,L)|^2 = \frac{2A^2}{81} (1 - \cos 3kL(7 + 2\cos 3kL - 2\cos\phi(1 - \cos 3kL) + 6\sin\phi\sin 3kL. \quad (39)$$

Define a quantity $S_1$ by the following equation:

$$S_1 = |a_I(L)|^2 = \frac{A^2}{4} (5 + 4\cos 3kL). \quad (40)$$

Define $S_2$ and $S_3$ by $$S_{2,3} = |a_{II,III}(\phi,L)|^2. \quad (41)$$

Referring to Eq. (39), $S_2$ and $S_3$ are given by $$S_{2,3} = \frac{2A^2}{81} (1 - \cos 3kL)(7 + 2\cos 3kL - \quad (42)$$
$$2\cos\phi(1 - \cos 3kLm 6\sin\phi\sin 3kL).$$

In Eq. (42) the $-$ sign applies to $S_2$ and the $+$ sign applies to $S_3$.

The signal output of the fiber optic rotation sensor 10 may be written in terms of $S_1$, $S_2$ and $S_3$:

$$\frac{S_3 - S_2}{S_1} = \frac{2A^2}{81} \frac{9}{A^2} \frac{(1-\cos 3kL)(12\sin\phi)\sin 3kL}{5 + 4\cos 3kL}. \tag{43}$$

$$\boxed{\frac{S_3 - S_2}{S_1} = \frac{8}{3} \sin\phi \frac{(1-\cos 3kL)\sin 3kL}{5 + 4\cos 3kL}.} \tag{44}$$

What is desired is to find the maxima and minima in the relationship of Eq. (44) with respect to the argument (3 kL) of the trigonometric functions in Eq. (44) to determine whether there is an optimum set of coupling ratios that do not change as the coupling length L changes.

Therefore, taking the derivative of Eq. (44) with respect to (3 kL) gives:

$$\frac{d}{d(3kL)} \frac{S_3 - S_2}{S_1} = \tag{45}$$

$$\frac{8}{3\sin} \phi[(\sin^2 3kL + (1-\cos 3kL)\cos 3kL \sin 3kL *$$

$$(5 + 4\cos 3kL) + 4(1-\cos 3kL)\sin^2 3kL] \; (5 + 4\cos 3kL)^{-2}.$$

At the maxima and minima of the expression of Eq. (45) has zero slope. Therefore, near the maxima and minima of Eq. (45), the coupler 12 has minimum sensitivity to temperature changes. To find maxima and minima in Eq. (45) the derivative is set to equal zero, which gives:

$$0 = -4\cos^3 3\,kL - 10\cos^2 3\,kL + 5\cos 3\,kL + 9. \tag{46}$$

Solving Eq. (46) for 3 kL gives $$3\,kL = 148.061 \text{ rad.} \tag{47}$$

Therefore the quantity kL is $$kL = 49.354 \text{ rad.} \tag{48}$$

Looking at the graph of FIG. 2, it is seen that the output has a maximum value when 3 kL=148.061 rad. Using the value of kL from Eq. (48) in Eq., (44), it is found that the signal output of the fiber optic rotation sensor 10 is $$\boxed{\frac{S_3 - S_2}{S_1} = 1.624 \sin\phi.} \tag{49}$$

Returning to Eqs. (22), (29) and (30), we than find that $$|a_1(L)|^2 = \frac{A^2}{9}(5 + 4\cos 3kL) = \frac{A^2}{9}(5 + 4\cos(148.061)). \tag{50}$$

$$|a_1(L)|^2 = \frac{A^2}{9}(5 + \cos(148.061)) \tag{51}$$

$$\boxed{|a_1(L)|^2 = 0.1783 A^2} \tag{52}$$

$$|a_2(L)|^2 = \frac{2A^2}{9}(1 - \cos 3kL) = \tag{53}$$

$$\frac{2A^2}{9}(1 - \cos(148.061)) = 0.4108 A^2.$$

$$\boxed{|a_2(L)|^2 = 0.4108 A^2} \tag{54}$$

$$\boxed{|a_3(L)|^2 = |a_2(L)|^2 = 0.4108 A^2.} \tag{55}$$

Therefore, the coupler splitting ratio is 0.4108:0.1783:0.4108. Referring to Eq. 34, the solution equation for the fiber optic rotation sensor is $$\boxed{\text{Output} = 1.624 \sin\phi = 1.624 \sin\left(\frac{2\pi lD}{\lambda c} \Omega\right)} \tag{56}$$

For this particular set of coupling ratios, the coupler 12 is insensitive to variations in coupling length that typically occur over time and temperature. The signals on the output legs are higher for this set of coupling ratios than for other coupling ratios.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A fiber optic rotation sensor for sensing rotation of a sensing loop of optical fiber about a sensing axis perpendicular to the plane of the sensing loop, comprising:

a 3×3 optical coupler that includes first, second and third optical waveguides formed in a substrate and arranged to have couping ratios such that the fractions of light coupled from any one of the first, second and third optical waveguides to the other two optical waveguides are constant, independent of temperature changes in the 3×3 optical coupler;

an optical signal source arranged to provide an input optical signal to the first optical waveguide such that portions of the input optical signal are coupled from the first optical waveguide into the second and third optical waveguides; and the optical fiber in which the sensing loop is formed having ends that are coupled to the second and third optical waveguides to receive optical signals that form counterpropagating optical waves in the sensing loop and to combine the counterpropagating optical waves after they have traversed the sensing loop.

2. A fiber optic rotation sensor for sensing rotation of a sensing loop of optical fiber about a sensing axis perpendicular to the plane of the sensing loop, comprising:

a 3×3 optical coupler formed in a substrate and that includes first, second and third optical waveguides arranged to have coupling ratios such that the fractions of light coupled from any one of the first, second and third optical waveguides to the other two optical waveguides are constant, independent of temperature changes in the 3×3 optical coupler;

an optical signal source arranged to provide an input optical signal to the first optical waveguide such that portions of the input optical signal are coupled from the first optical waveguide into the second and third optical waveguides; and the optical fiber in which the sensing loop is formed having ends that are coupled to the second and third optical waveguides to receive optical signals that form counterpropagating optical waves in the sensing loop and to combine the counterpropagating optical waves after they have traversed the sensing loop, the first, second and third optical waveguides being formed such that the optical splitting ratios are 0.4108:0.1783:0.4108, so that when light intensity $A^2$ is input to the first optical waveguide, the optical intensity output by each of the second and third optical waveguides to the optical fiber to form the counterpropagating waves is $0.4108A^2$ and the optical intensity output by the first optical waveguide is $0.1783A^2$.

3. A method for measuring rotations with a fiber optic rotation sensor that senses rotation of a sensing loop of optical fiber about a sensing axis perpendicular to the plane of the sensing loop, comprising the steps of:

forming a 3×3 optical coupler formed in a substrate and that includes first, second and third optical waveguides;

arranging the first, second and third optical waveguides to have an interaction length in which light couples between the first, second and third optical waveguides;

forming the first, second and third optical waveguides such that the fractions of light coupled from any one of the first, second and third optical waveguides to the other two optical waveguides are constant, independent of thermally-induced changes in the interaction length;

arranging an optical signal source to provide an input optical signal to the first optical waveguide such that the 3×3 optical coupler couples portions of the input optical signal from the first optical waveguide into the second and third optical waveguides; and coupling the ends of the fiber in which the optical fiber sensing loop is formed to the second and third optical waveguides to receive optical signals that form counterpropagating optical waves in the sensing loop and to combine the counterpropagating optical waves after they have traversed the sensing loop.

4. A method for measuring rotations with a fiber optic rotation sensor that senses rotation of a sensing loop of optical fiber about a sensing axis perpendicular to the plane of the sensing loop, comprising the steps of:

forming a 3×3 optical coupler formed in a substrate and that includes first, second and third optical waveguides;

arranging the first, second and third optical waveguides to have an interaction length in which light couples between the first, second and third optical waveguides;

forming the first, second and third optical waveguides such that the fractions of light coupled from any one of the first, second and third optical waveguides to the other two optical waveguides are constant, independent of thermally-induced changes in the interaction length;

arranging an optical signal source to provide an input optical signal to the first optical waveguide such that portions of the input optical signal are coupled from the first optical waveguide into the second and third optical waveguides; and coupling the ends of the fiber in which the optical fiber sensing loop is formed to the second and third optical waveguides to receive optical signals that form counterpropagating optical waves in the sensing loop and to combine the counterpropagating optical waves after they have traversed the sensing loop;

forming the first, second and third optical waveguides such that the optical splitting ratios are 0.4108:0.1783:0.4108, so that when light intensity $A^2$ is input to the first optical waveguide, the optical intensity output by each of the second and third optical waveguides to the optical fiber to form the counterpropagating waves is $0.4108A^2$ and the optical intensity output by the first optical waveguide is $0.1783A^2$.

* * * * *